Figure 1:
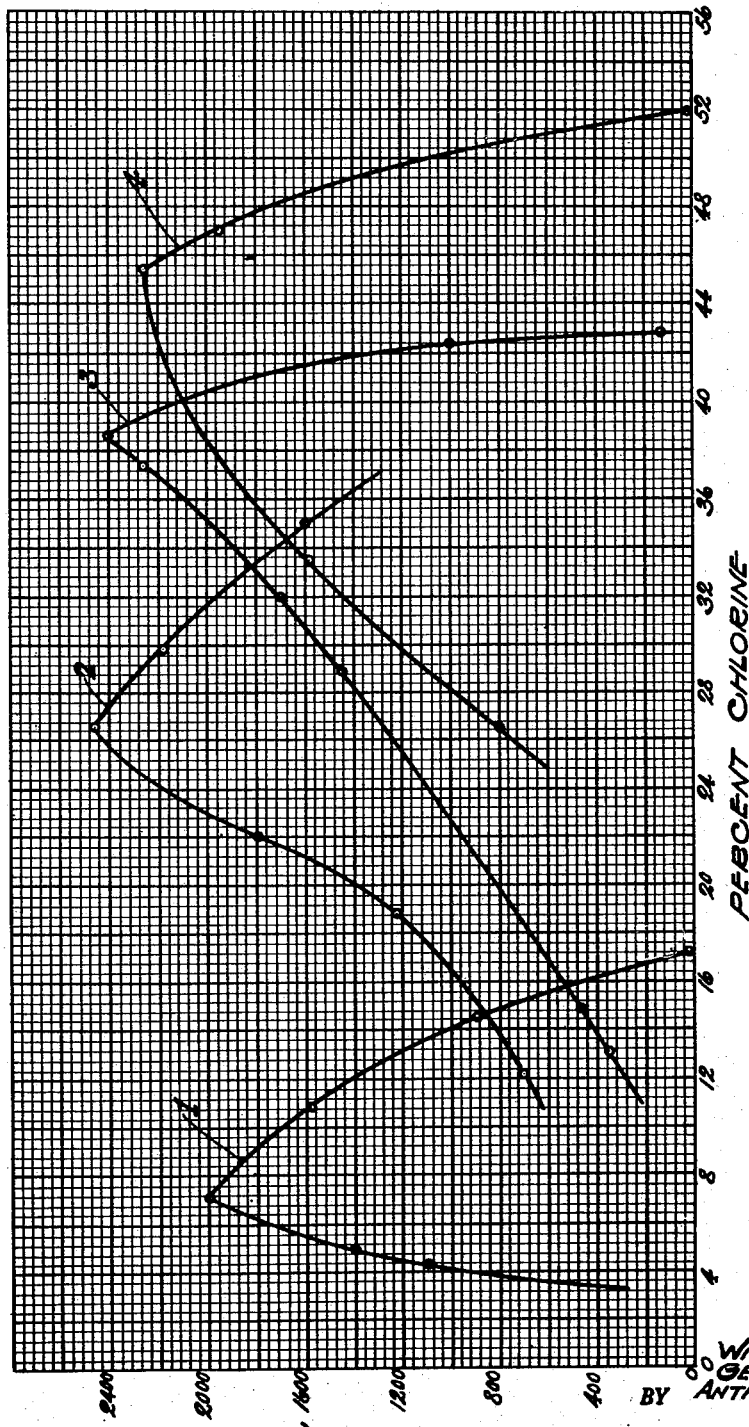

NO. 1
92 PERCENT ISOPRENE
8 PERCENT α-METHYL
P-METHYL STYRENE

NO. 2
90 PERCENT ISOPRENE
10 PERCENT VINYLIDENE
CHLORIDE

Patented Oct. 2, 1951

2,569,536

UNITED STATES PATENT OFFICE 2,569,536

LAMINATED STRUCTURE

William B. Reynolds, Bartlesville, Okla., and Gerard Kraus and Anthony Conciatori, Cincinnati, Ohio, assignors to General Motors Corporation, Detroit, Mich., a corporation of Delaware Application November 27, 1946, Serial No. 712,670

2 Claims. (Cl. 154—43)

This invention relates to adhesion cements and to a means for bonding vulcanizable rubberlike compositions to hard substantially non-porous surfaces through the medium of said cements.

It is therefore an object of the invention to provide an adhesion cement which will readily bond a vulcanizable rubberlike material to the surface of a hard substantially non-porous material wherein the vulcanizable rubberlike material is taken from that class of compounds consisting of conjugated diolefin polymers.

In carrying out the above object, it is a further object to utilize as a base for the cement a co-polymer of a substituted ethylene compound and a conjugated diene compound wherein the co-polymer is halogenated either partially or completely.

Another object of the invention is to provide an adhesion cement comprising a base of a halogenated co-polymer of a conjugated diene compound and a substituted ethylene compound, wherein the halogen utilized is chlorine or combinations of chlorine and bromine.

In carrying out the above objects, it is a further object to use halogenated co-polymers wherein the conjugated diene compound is taken from the class consisting of butadiene and pentadiene or substituted derivatives thereof and wherein the substituted ethylene compound is taken from the class consisting of compounds containing either a vinyl or a substituted vinyl substituent and wherein the principal examples include substituted styrene compounds.

Another object of the invention is to provide a means for bonding vulcanizable rubberlike materials taken from the class consisting of, natural rubber, reclaimed rubber, butadiene-styrene-co-polymers, polychloroprene, butadiene-acrylonitrile co-polymers and elastomers falling within the class of conjugated diolefin compounds and wherein the hard base material is taken from the class consisting of wood, rubber, glass, metal and the like, wherein a tempering layer is utilized between chlorinated adhesion cement and the rubberlike material, said tempering layer being used as a means for increasing the strength of bond and being preferably selected from the class consisting of highly reinforced rubber cements.

Further objects and advantages of the present invention will be apparent from the following description, reference being made to the drawings, wherein preferred embodiments of the present invention are clearly shown.

Figure 2:
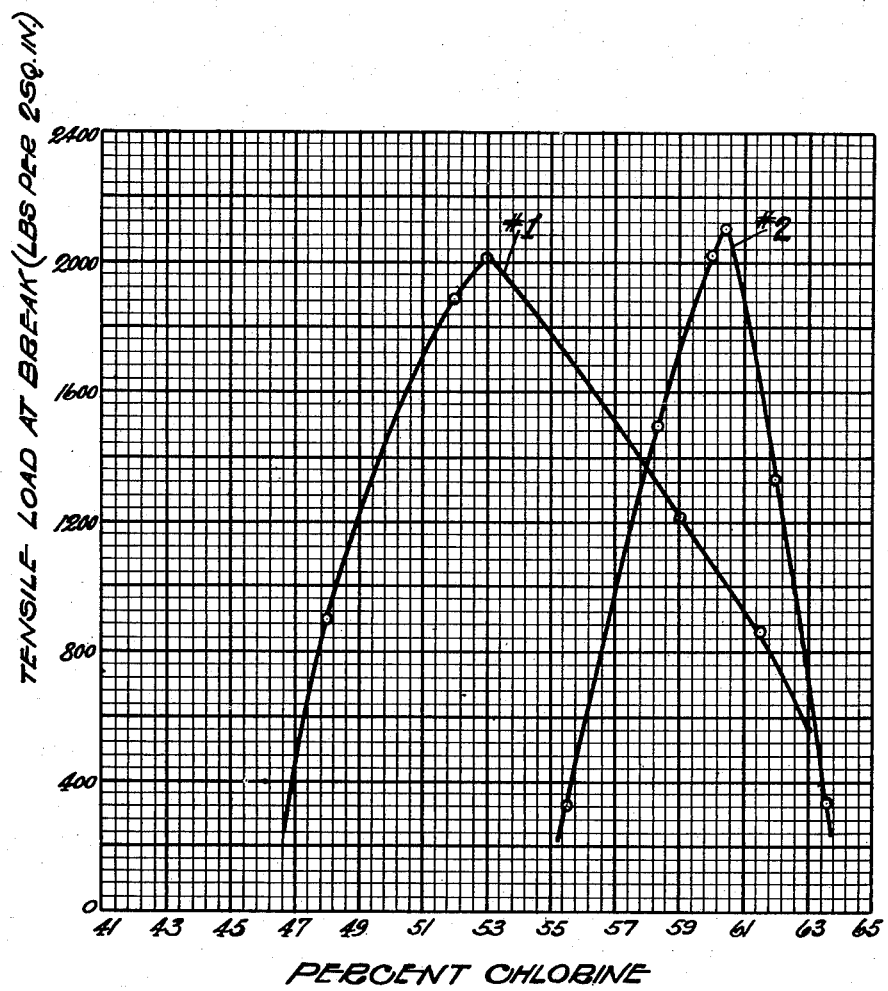
Figure 3:
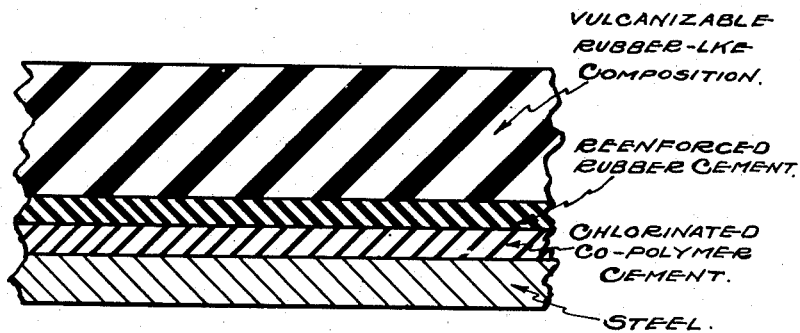

In the drawings:

Fig. 1 is a chart showing graphically the bond strengths for a co-polymer cement having varying percentages of isoprene and styrene therein plotted against the percentages of chlorine in the cement Fig. 2 is a chart showing graphically bond strengths for two different co-polymer cements, curve number one being a cement of isoprene and alpha-methyl-para-methyl styrene and curve number two being a cement of isoprene and vinylidine chloride, plotted against the percentages of chlorine in the cements, and Fig. 3 is an enlarged cross sectional view of a cemented assembly.

The use of chlorinated conjugated diolefin polymer cements is not new. In copending applications 661,013 and 645,666, now abandoned, together with application Serial No. 710,326, all assigned to the assignee of the present invention, various chlorinated cements are shown wherein polyisoprene, polychloroprene and polymethylpentadiene are used as base materials. In each case, the chlorination of the compound is selectively controlled and in all cases is not complete. Bond tests on these cements made under ASTM methods show relatively high pulls when compared to other types of fully chlorinated cements being sold on the market.

The present invention is directed to a different type of cement which also yields high pulls. This new cement which will be defined in more detail hereinafter, is a co-polymer type of cement wherein the base material is a combination of polymers of two main classes, namely, a conjugated diene with a substituted ethylene compound wherein the co-polymer is chlorinated either completely or incompletely as is desired. The quantities of the monomers in the co-polymer may be varied widely as will be shown hereinafter and in all cases the cement formed therefrom has been found to be particularly desirable since the physical properties of the co-polymer may be varied through a broad range in view of the specific use of the cement.

In forming the co-polymer, polymerization is obtained by the use of conventional methods wherein the two monomers are placed in a flask, preferably with a small quantity of soap flakes, potassium persulfate, tertiary dodecyl mercaptan and water. This mixture is kept at a constant temperature under agitation for a period of hours until polymerization has progressed to desired extent.

Specifically as an example 100 parts of the two monomers in the desired proportions may be placed in a 12 oz. crown capped bottle together with 5 grams of soap flakes, 0.3 of a gram of potassium-persulfate, 0.4 of a gram tertiary dodecyl mercaptan and 180 grams of water. The bottle is rotated in a water bath, preferably kept at 50° C., and conversions up to 98% were obtained in from 24 to 42 hours depending upon the specific monomers utilized in the polymerization process and the percentage of conversion desired. Obviously, the quantities of reagents may be varied with varying requirements for time and temperature and since the co-polymerization of the monomers forms no part of this invention, it is to be understood that the example given herein is not a limitation.

After the co-polymer has been made, it is chlorinated under conditions set forth in the other applications referred to herein to the desired percentage of chlorine. Preferably this may be accomplished by taking from 25 to 50 parts of the co-polymer and dissolving in 500 parts of carbon tetrachloride or other solvent, after which the chlorine or other halogen is led into an agitated solution kept at a substantially constant temperature until the desired chlorine content is obtained as determined by sample analysis. The chlorinated mixture is then run off into boiling water to remove the solvent. The chlorinated co-polymer is taken from the water and dried. In making up one adhesion cement, the chlorinated co-polymer in quantities of 20 parts is dissolved in 80 parts of a suitable solvent for example one containing xylene and about 15% carbon tetrachloride. The adhesion cement when adjusted to the desired viscosity, is ready for use and may be applied by brushing, spraying, dipping or other conventional methods of application. It will be noted, that this cement contains none of the compounding ingredients usually found in cements sold on the market. Softeners, reinforcing agents, vulcanizing agents, accelerators, etc., do not yield improvement in strength of bond when added to the adhesion cement. Therefore we do not propose to use any compounding ingredients in the cement. However, if said ingredients are added, the resulting cement is considered to come within the scope of the present invention. The percent chlorination may vary in accordance with the result desired and it has been found that with isoprene ranging from 10% to 50% and styrene ranging from 90% to 50%, that chlorinations ranging from 5% to 49% may be used to yield pulls averaging 750 pounds per square inch or more. This is clearly shown in the graph, Fig. 1, wherein the pulls on a two square inch sample are charted, such sample being the standard ASTM test sample.

Another factor which contributes to the success of our cement and aids in increasing the strength of bond, is the use of a tempering layer. The copolymer type adhesion cement is primarily adapted for bonding to metal, glass, wood or other hard substantially non-porous surfaces. We, therefore, propose to use a tempering layer between the rubber and the adhesion cement whereby the adhesion cement readily bonds to the tempering layer and the tempering layer bonds with greater strength to the rubber than can be accomplished when its use is eliminated. This tempering layer may be any conventional, highly reinforced type rubber cement and is preferably one which includes substantial quantities of carbon black and/or sulphur so that the physical characteristics of the tempering layer are different from rubber stock in being harder and tougher but not as extremely different as are the characteristics of the adhesion cement layer. In this manner, a gradual tempering of hardness is obtained, that is, a gradual increase in hardness from any specific rubber stock to the adhesion cement.

Any highly reinforced conventional rubber cement may be used as a tempering layer, such as a cement containing rubber, channel carbon black and solvent, rubber, high sulfur and a solvent, or combinations thereof. In this connection, fillers, plasticizers and accelerators may be added if desired, together with suitable softening agents, the main ingredients in the tempering layer being rubber, channel carbon black and/or sulfur in appreciable quantities. The specific proportions are not of any great importance but when major deviations are made from the suggested formulas samples should be checked for adhesion results.

Three representative formulas of cements which may be used in the tempering layer are as follows:

*Formula #1*

| | Percent |
|---|---|
| Butadiene-styrene co-polymer | 48 |
| Carbon black (channel) | 27 |
| Accelerators, aging and vulcanizing agents, etc. | 2 |
| Zinc oxide | 23 |
| Solvent (normal heptane), as required. | |

*Formula #2*

| | Percent |
|---|---|
| Smoked rubber sheet | 38 |
| Carbon black (channel) | 34 |
| Sulfur | 21 |
| Accelerators, softening agents and antioxidant compound | 5 |
| Zinc oxide | 2 |
| Solvent (normal heptane), as required. | |

*Formula #3*

| | Percent |
|---|---|
| Rubber (natural) | 40 |
| Carbon black (channel) | 60 |
| Solvent (any aliphatic solvent), as required. | |

From the above three formulas it may be seen that wide variations in ingredients and quantities thereof are possible. In all the above formulas, butadiene-styrene co-polymer, smoked sheet, pale crepe, polyisoprene or polychloroprene may be used interchangeably.

Many monomers may be used in the formulation of the halogenated co-polymer cement and for sake of clarity only a few will be mentioned here, other monomers which come within the limitations of the terms are understood to be useable if desired. Preferably the conjugated diene monomers may be taken from the broad classes of butadienes and pentadienes and the substituted products of said materials such as: isoprene; dichloro-butadiene; 2, 3 di-methyl butadiene; chloroprene; 2, methyl-pentadiene, 1,3; 4-methyl-pentadiene 1,3; and pentadiene (piperylene). The substituted vinyl or ethylene compounds include such examples as alpha-para-dimethyl-styrene, dichloro-styrene, vinylidene chloride, methyl methacrylate, styrene, mono-chloro-styrene, di-fluoro-styrene, mono-fluoro-styrene, acrylonitrile, etc.

The percentage of the monomers in the co-polymer may vary widely and any combination will be satisfactory which will be soluble and will not form an irreversible gel during the halogenation process, although gels which are dispersible will function in a satisfactory manner, and the charts shown in Figs. 1 through 2 show graphically various examples. Fig. 2 discloses a 92% isoprene, 8% alpha-para-dimethyl-styrene copolymer wherein the adhesion under pull on a two square inch specimen is plotted against the percentage chlorine added to the co-polymer. A similar graph is shown in Fig. 2 wherein the co-polymer is a 90% isoprene, 10% vinylidene chloride mixture. Fig. 1 shows a series of graphs for varying percentages of isoprene and styrene in the co-polymer, for example, wherein the iso-prene varies from 10 to 50% and the styrene varies from 90 to 50%. These charts illustrate the wide variations which may occur in the co-polymer without in any way affecting the adhesion strength of the cement. In all cases a satisfactory cement is considered to be one which yields a pull of 1500 lbs. per 2 square inch specimen measured by the standard ASTM method or stated differently 750 lbs. per square inch pull. In all instances the tests were carried out on rubber to steel bonds wherein a two square inch specimen of rubber was coated with a highly reinforced rubber cement to produce a tempering layer which cement was air dried after which a coat of the chlorinated co-polymer cement was applied. Finally the steel plate was put in place and the assembled specimen was vulcanized for from 20 to 30 minutes at about 300° F. In connection with bonds between metal and certain synthetic rubbers, for example, butadiene-acrylonitrile stock, the tensile strength of the stock was not as great as the strength of the bond with the result that high pulls were not obtained due to failure of the stock per se. In these cases the cement is satisfactory even though poor test results are forthcoming. When improvement of physical characteristics of the stock are obtained the high pulls found in other tests will be possible.

From the foregoing it is apparent that we have discovered a new type of adhesion cement and a method of application therefor which presents a wide field of use and wherein the co-polymer cement may be compounded to have varying physical properties in accordance with the halogenation thereof and the percentages of the monomers used in the co-polymer. Further our improved cements are easy to manufacture due to the complete absence of compounding ingredients in the preferred embodiments. In all cases, where the cement is used it is possible to eliminate brass plating of the metal parts heretofore required with prior art cements. It is manifest that other synthetic rubbers differing from those specifically mentioned which fall within the class of conjugated diolefin polymers may be used. It is also apparent that the use of a tempering layer is not necessary where hard surfaces are to be bonded together for example, metal to metal, wood to wood, for in these cases there is no necessity in tempering the adhesion layer.

While the embodiments of the present invention as herein disclosed, constitute preferred forms, it is to be understood that other forms might be adopted, all coming within the scope of the claims which follow.

What is claimed is as follows:

1. A new article of manufacture comprising a laminated structure including at least four layers, one of said layers being a hard non-porous material, another of said layers consisting of rubberlike material taken from the class consisting of conjugated diolefin compounds and an intermediate layer co-extensively bonded to the non-porous layer consisting of a chlorinated adhesion cement consisting of a partially chlorinated co-polymer of a conjugated diene compound taken from the class consisting of isoprene; 2,3 di-methyl butadiene; di-chloro butadiene, chloroprene; 2 methyl pentadiene 1,3-4-methyl-pentadiene 1,3 and piperylene and a substituted ethylene compound wherein the chlorination of the copolymer is between 5% and 49% thereof taken from the class consisting of styrene; alpha-para-di-methyl-styrene; di-chloro-styrene; vinylidene chloride; methyl-methacrylate; mono-chloro-styrene; acrylonitrile; di-fluoro-styrene and mono-fluoro-styrene and a second intermediate layer disposed between said chlorinated co-polymer layer and said conjugated diolefin compound layer, said second intermediate layer consisting of a reinforced rubber cement containing rubber, carbon black in quantities by weight of at least 56% of the rubber, and a solvent, said article being substantially integral whereby the rubberlike layer is bonded to the non-porous material through said intermediate layer by a bond that will withstand a pull of at least 750 lbs. per square inch.

2. A new article of manufacture comprising a laminated structure including at least four layers, one of said layers being steel another of said layers consisting of a rubberlike material taken from the class consisting of conjugated diolefin compounds and an intermediate layer coextensively bonded to the non-porous layer consisting of a partially chlorinated copolymer of isoprene and styrene wherein the isoprene ranges from 10 to 50% by weight of the copolymer and the styrene ranges from 90 to 50% of the copolymer and wherein the chlorination of said copolymer is between 5 and 49% thereof and a second intermediate layer consisting of a reenforced rubber cement containing rubber and carbon black in quantities by weight of at least 56% by weight of the rubber and a suitable solvent, said second intermediate layer being between said chlorinated copolymer layer and said conjugated diolefin layer whereby the conjugated diolefin layer is bonded to the non-porous material through said intermediate layers by a bond which will withstand at least 750 pounds per square inch.

WILLIAM B. REYNOLDS.
GERARD KRAUS.
ANTHONY CONCIATORI.

REFERENCES CITED

The following references are of record in the file of this patent:

UNITED STATES PATENTS

| Number    | Name          | Date          |
|-----------|---------------|---------------|
| 2,222,345 | Blomer et al. | Nov. 19, 1940 |
| 2,234,621 | Brous         | Mar. 11, 1941 |
| 2,301,926 | Blomer et al. | Nov. 17, 1942 |
| 2,327,705 | Frolich et al.| Aug. 24, 1943 |
| 2,406,903 | Rethorst      | Sept. 3, 1946 |
| 2,407,668 | Leatherman    | Sept. 17, 1946 |
| 2,408,174 | Morey         | Sept. 24, 1946 |
| 2,418,025 | Garvey        | Mar. 25, 1947 |

FOREIGN PATENTS

| Number  | Country       | Date          |
|---------|---------------|---------------|
| 519,175 | Great Britain | Mar. 19, 1940 |